Figure 1:
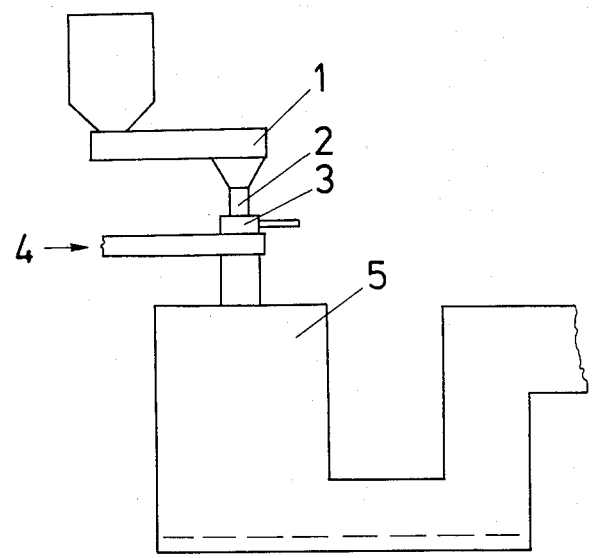
Figure 2:
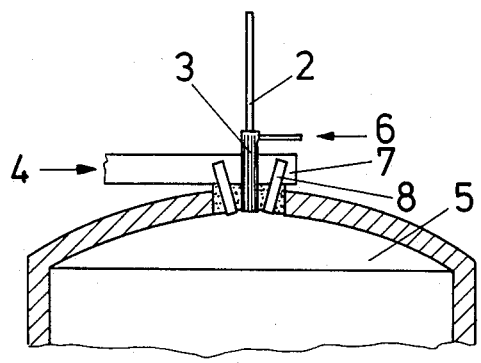

United States Patent [19]

Lilja et al.

[11] Patent Number: 4,490,170
[45] Date of Patent: Dec. 25, 1984

[54] METHOD FOR FORMING A DIRECTIONAL AND CONTROLLED SUSPENSION SPRAY OF A PULVEROUS MATERIAL AND A REACTION GAS

[75] Inventors: Launo L. Lilja; Valto J. Mäkitalo, both of Pori, Finland

[73] Assignee: Outokumpu Oy, Helsinki, Finland

[21] Appl. No.: 440,387

[22] Filed: Nov. 8, 1982

[30] Foreign Application Priority Data

Nov. 27, 1981 [FI] Finland ............... 813808

[51] Int. Cl.³ .............................. C22B 5/12
[52] U.S. Cl. ........................... 75/26; 75/74; 75/92
[58] Field of Search .................... 75/26, 74, 92

[56] References Cited

U.S. PATENT DOCUMENTS

| | | | |
|---|---|---|---|
| 3,306,708 | 2/1967 | Bryk et al. | 75/92 |
| 3,563,726 | 2/1971 | Elvander et al. | 266/172 |
| 4,392,885 | 7/1983 | Lilja et al. | 75/26 |

Primary Examiner—M. J. Andrews

Attorney, Agent, or Firm—Henderson & Sturm

[57] ABSTRACT

A method for forming a directional and controlled suspension spray of a pulverous material and a reaction gas is intended for use in metallurgical processes and plants. In flash smelting, reaction gases are fed into a cylindrical vertical reaction chamber centrally through the top of the reaction chamber. The blasting in is via a specific blast-in member, into which the gases are usually directed horizontally for reasons of space use. This results in that the flow in the reaction chamber is asymmetrical. This disadvantage can be eliminated by means of a method according to the present invention. In the method according to the invention a pulverous material is directed into the reaction chamber mixed with a primary dispersion gas, a reaction gas directed into the reaction chamber in at least three separate, at least partly turbulent jets symmetrically around the flow of the pulverous material, and the reaction gas jets are caused in the reaction chamber to discharge into the flow of the pre-dispersed pulverous material in order to produce a turbulent but controlled suspension spray.

4 Claims, 12 Drawing Figures

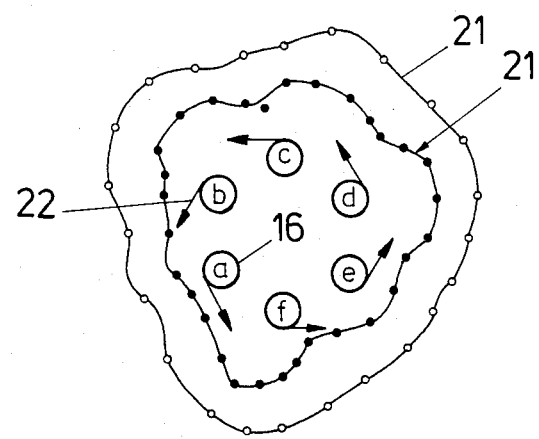
Fig. 7
Fig. 8
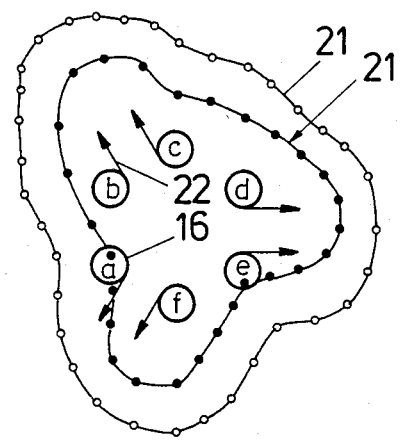

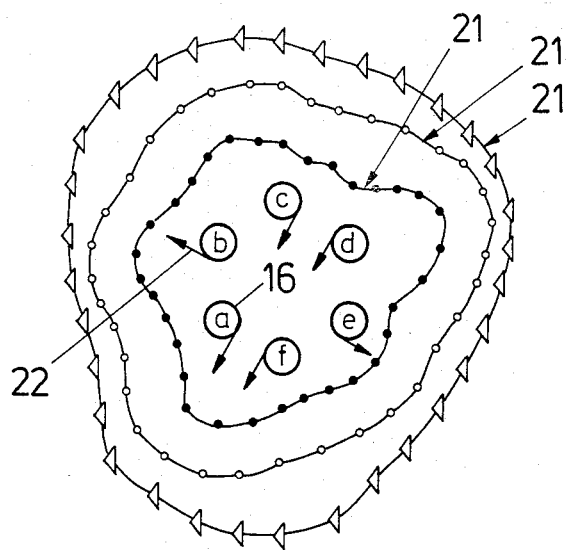
Fig. 9
Fig. 10
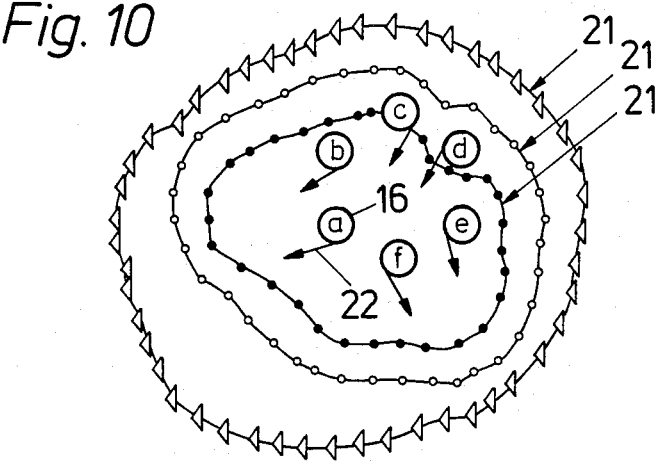

METHOD FOR FORMING A DIRECTIONAL AND CONTROLLED SUSPENSION SPRAY OF A PULVEROUS MATERIAL AND A REACTION GAS

BACKGROUND OF THE INVENTION

The present invention relates to a method for deflecting a flow of reaction gas and for making the part flows formed from the gas turbulent in separate turbulence pipes and for directing them externally to meet a predispersed suspension spray discharging into the reaction chamber, in order to produce a velocity difference, important for reactions, between the particles of the pulverous material and the flow of reaction gas and to shape and control the suspension spray which is being formed.

Two principles are applied to the feeding of a suspension of a reaction gas and a pulverous material into a reaction chamber. According to these principles, the suspension is formed either at a point prior to the actual blast-in device or by means of the blast-in device itself. The former method us used in conventional carbon-dust burners in carbon-dust heating or in metallurgical systems in which a pneumatically carried, finely-divided ore or concentrate, together with its carrier gas, is blown directly into the reaction vessel. When this method is applied, the blast-in velocity must be adjusted so that no blow-back of the reactions can occur.

When high degrees of preheating are used, or in other cases in which the suspension formed is highly reactive, e.g. in the oxygen smelting of a metallurgical sulfide concentrate, the final formation of the suspension must be carried out as close to the reaction chamber as possible, or preferably, as in accordance with the present invention, in the reaction chamber itself.

There are in the literature numerous descriptions of the feeding of a suspension into a reaction chamber. Most of them deal with either direct blowing of a pneumatically carried, finely-divided solid material or systems in which the suspension spray is formed as if in an ejector by means of pressure pulses generated in the reaction gas and blown into the reaction chamber. Such a spray forms a cone with a flare angle of 15°–20° and with the highest concentration of the solid material in the center of the spray. The pattern of the distribution depends mainly on the properties of the solid material and on the flow velocity of the suspension. The solid material and the gas have in this case substantially the same direction.

As known, the transfer of mass between a reacting solid particle and the surrounding gas depends substantially on the velocity difference between them.

It is known and easy to calculate that, within the gas velocity ranges and concentrate particle size ranges normally used in metallurgical apparatuses, the velocity difference between a concentrate particle and the gas tends to be rapidly attenuated. For this reason it is important that the velocity difference between a solid particle and the reaction gas, important for the transfer of mass, is produced or maintained in the reaction chamber at a point where the conditions for the reactions otherwise exist. In cases in which the reacting materials are mixed already at a point prior to the blast-in, the kinetic energy producing the velocity differences is usually at its highest at the blast-in point or a point prior to it. If, on the other hand, the mixing is carried out in the reaction chamber itself, it is possible to adjust the highest velocity difference to be at the desired point in the reaction chamber.

This is so even in a case in which the materials are mixed in part already before they are blasted into the reaction chamber and the final mixing is carried out in the reaction chamber itself.

In several metallurgical processes, such as flash smelting, the reaction gases are directed into a cylindrical, vertical reaction chamber centrally through the top of the reaction chamber via a specific blast-in member, into which the gases are directed horizontally for reasons of space use, etc. This usually results in a one-sided flow in the reaction chamber, since it is difficult to obtain a sufficient length in proportion to the diameter for sufficient control of the blasting in.

Deflection of the reaction gases so as to be parallel to the central axis of the reaction chamber is described in GB patent application No. 2 090 159A. According to this application, the reaction gas is divided into part flows by means of partitions. The part flows are caused to deflect so as to be parallel to the central axis of the reaction chamber in such a way that their velocity simultaneously increases and the part flows discharge into the reaction chamber in such a way that they surround as an uninterrupted curtain the flow of concentrate which is fed from the inside. In the reaction chamber the reaction gas and the concentrate form a controlled suspension spray.

These problems due to a one-sided flow do not appear if the blasting is carried out in accordance with the present invention, since the flow of reaction gas is divided into separate part flows, whereupon the necessary ratio of the cross-sectional area to the conduit length can easily be realized in the flow conduits for the part flow.

SUMMARY OF THE INVENTION

The present invention thus relates to a method for forming a turbulent, directional suspension spray in the reaction chamber itself in order to produce a maximal velocity difference between the particles of a pulverous material and the reaction gas at a point advantageous for the reactions in the reaction chamber, by utilizing pre-dispersing of the pulverous material, dividing of the bulk of the reaction gas into turbulent, directional part flows comprising turbulent jets, and the kinetic energy of these part flows.

In accordance with the invention, the suspension spray is formed by means of devices installed in the top or wall of the reaction chamber, for example as follows:

For reasons of space use it is often advantageous to direct the reaction gas to the burner along a conduit which is mainly horizontal. In such a case one important task of the burner is to deflect the gas in the desired direction in the reaction chamber, for example so as to be parallel to the chamber axis. Another important task is to distribute the reaction gas in the desired manner, for example symmetrically, over the cross sectional area of the reaction shaft.

According to the present invention, the reaction gas is directed preferably along one conduit into the distribution chamber situated at the arch of the reaction chamber. Of course, a distribution chamber is not required if the number of feed conduits corresponds to the number of the turbulence pipes.

By means of three or more discharge pipes leading from the distribution chamber to the mixing chamber, the reaction gas flow is divided into part flows, which are caused to flow into the turbulence pipe via a turbulence-producing, preferably regulatable member. The turbulence pattern produced at the mixing point can be adjusted by means of the number, position, and location of the turbulence pipes and the direction of the turbulence.

It is known that both a non-rotating and a rotating gas spray is capable of absorbing gas from its environment, in which case a strong mixing area and a high degree of turbulence are formed in the edge areas of the spray. It is possible to deduce theoretically the absorption efficiency ($Q/Q_o$), if the gas discharge velocity into the furnace ($u_o$) is taken as a constant and the discharge area is divided into one or several (N) discharge inlets, the other conditions remaining constant. This absorption efficiency complies with the law: $Q/Q_o=(C_1+C_2S\sqrt{N\bar{x}}$, where Q=gas amount in the cross section of the spray at distance $\bar{x}$ from the discharge inlet, $Q_o$=gas amount in the discharge inlet, $C_1$ and $C_2$=constants due to the process, S=value deriving from the turbulence of the gas spray.

This means that in the present invention it is possible, by means of the number (N) of the turbulence pipes, their orientation and their distance from the centrally fed suspension of solid, to control the absorption efficiency ($Q/Q_o$) of the environmental gases into the sprays and thereby to influence the strength of both the mixing and the turbulence. It should be noted that several sprays have more edge area with a strong turbulence than has one spray.

This characteristic can be exploited not only for speeding up the heating of the sprays by means of furnace gases but also for mixing the gases fed into the furnace, for example in the following manner: Another gas is fed from around the turbulence pipes, mainly at a lower velocity, whereby the gases can be caused to mix according to the principle described above. In each case the process conditions determine the control.

A mainly pre-mixed and pre-dispersed flow of a suspension of a pulverous material and the primary gas is fed into the formed turbulence field having a circular cross section, whereupon the turbulent flows of the secondary gas, discharging from the turbulence pipes, are "drilled" into the said, preferably well dispersed suspension spray and, owing to their strong turbulence, produce between the gas and the solid particles a velocity difference advantageous for reactions. By controlling the turbulence field produced by the turbulent flows it is possible to control the point at which the suspension spray and the turbulent flows meet, the mixing efficiency and also the distribution of the suspension in the reaction chamber subsequent to the meeting.

The centrally arriving suspension spray can be formed by using known methods, for example the methods according to U.S. Pat. No. 4,147,535 or U.S. Pat. No. 4,331,087, or a suspension formed during pneumatic transport.

The most important advantages of the present invention are:

It is possible to use only one inlet conduit for the secondary gas (thermal insulation, cost of materials, space requirement, etc.).

It is possible to orient the reaction gas sprays in a desired and controlled direction.

It is possible to use a separate member for dispersing the pulverous material, the choice of the member depending on the process requirements.

By controlling the strength and direction of the turbulence of the secondary gas sprays, different turbulence fields can be produced according to the process require- ments.

The structure of the apparatus is low.

It is possible to use the method in connection with pneumatic transport without a separate reception silo and even without a dispersing member.

It is possible to use the method in connection with highly reactive concentrates, especially when using a high degree of oxygen enrichment, since the final combining does not take place until the reaction chamber.

The invention can also be applied to reverberatory furnaces. In this case all or, for example, part of the concentrate is fed into the reaction chamber from the end of a substantially horizontal furnace. Part of the concentrate can be fed normally onto the furnace walls in order to protect them. The concentrate fed from the end of the furnace can be fed in, for example, pneumatically, in which case it is partly mixed with reaction gas, but most of the reaction gas is blasted in the form of turbulent part flows from around the concentrate spray in order to form a substantially horizontal, directional and turbulent suspension spray. Of course, the system according to the invention can be used, in the manner of the previously described flash furnace application, for feeding a concentrate suspension from the arch of a reverberatory furnace.

DESCRIPTION OF THE DRAWINGS

FIG. 1 is a schematic representation of one object of application of the invention, a flash smelting furnace, FIG. 2 is a schematic representation of a vertical section of a preferred embodiment of the invention, FIG. 3 depicts in greater detail, as a cross-sectional oblique axonometric representation, the structure of the apparatus depicted in FIG. 2, FIG. 4 depicts, as an oblique axonometric representation, one regulatable turbulence pipe, FIG. 5 depicts the velocity distributions of the gas of Example 2 in an apparatus according to the invention, FIG. 6 depicts the velocity distributions of the gas of Example 3 in an apparatus according to the invention, FIGS. 7–10 depict the constant-velocity curves of the gas of Example 4 in accordance with the invention, FIG. 11 depicts the solid and gas distribution formed by a pneumatically fed pulverous solid, in a suspension spray, FIG. 12 depicts the solid and gas distribution formed by a pneumatically fed spray of pulverous solid material when it has been dispersed in the manner according to the invention.

DESCRIPTION OF THE PREFERRED EMBODIMENTS

In FIG. 1, reference numeral 1 indicates a conveyor by means of which pulverous material is carried to the upper end of a pouring pipe 2 in such a way that pulverous material falls continuously through the pouring pipe through which the pulverous material is directed to a dispersing member 3 by means of which a suspension of the pulverous material and the primary gas is fed into the reaction chamber. The secondary reaction gas 4 is directed into the reaction chamber 5 via discharge pipes situated around the member 3.

In FIG. 2, the pulverous material flowing via the pouring pipe 2, which can also be the discharge pipe of a pneumatic conveyor, is fed into the dispersing member 3, in which the primary dispersion gas 6 and the pulverous material are pre-mixed and dispersed into the reaction chamber 5. It is thus possible to feed via the pipe 2 alternatively a pneumatically conveyed pulverous material, in which case the dispersing member 3 and the dispersion gas 6 are not necessarily required. The secondary reaction gas 4, the amount of which is usually larger than that of the primary gas, is most commonly directed into the distribution chamber 7 almost horizontally, advantageously along one conduit. The gas can be directed into the distribution chamber 7 either radially or tangentially, depending on the structure and position of the turbulence-producing member of the discharge pipes 8. The reaction gas, distributed into three, preferably six, discharge pipes 8, is directed as a jet rotating about its axis into the reaction chamber 5, drilling its way, from butside the suspension spray, into the pre-mixed and pre-dispersed suspension spray of the pulverous material and the primary gas, which is discharging from the dispersing member 3.

Figure 3:
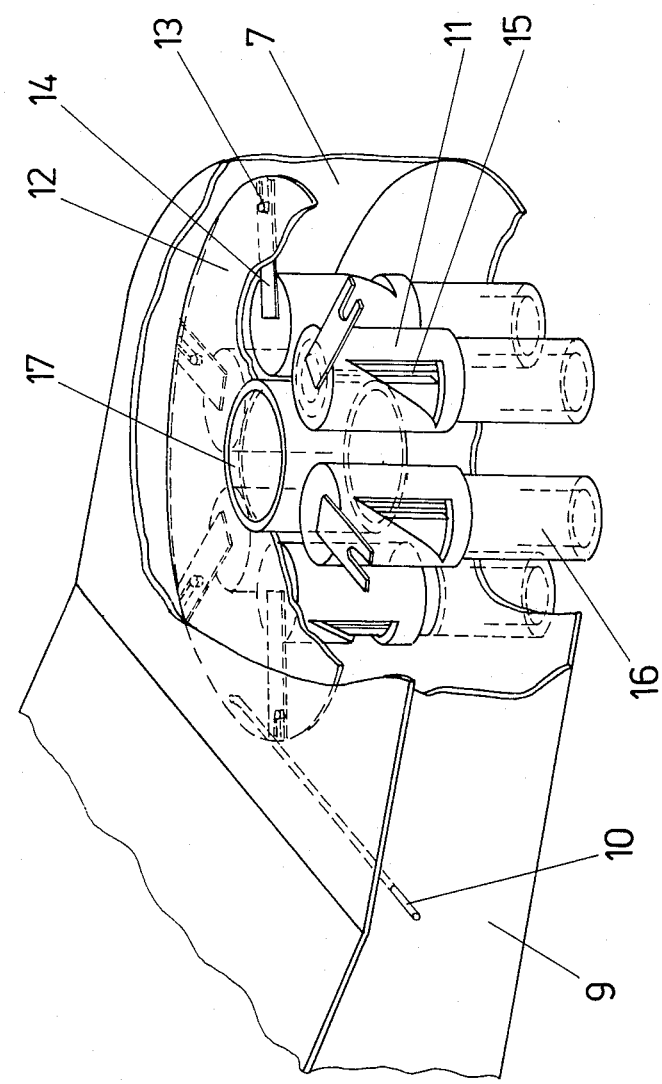

FIG. 3 depicts the structure of the turbulence pipes in greater detail and one preferred control system for making the gas turbulent. Attached to the feeding conduit 9 for reaction gas there is a rod 10 by means of which a plate 12 is turned. The plate 12 is connected by means of a pin 13 to a lever 14; the control opening 15 is adjusted by means of a control sleeve 11 by turning the lever 14. The control sleeves 11 in the distribution chamber 7 are situated in the upper part of the turbulence pipes 16. The lower ends of the turbulence pipes 16 extend to the lower edge of the top of the reaction chamber 5. The space reserved for the dispersion member is indicated by numeral 17.

Figure 4:
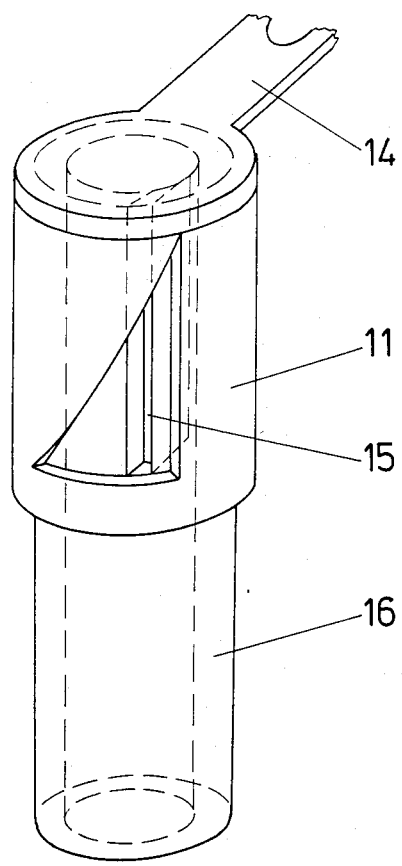

In FIG. 4, the height of the opening 15 can be regulated by means of the control sleeve 11 by turning the lever 14, whereupon the tangential input velocity at the opening 15 changes, thereby producing a change in the rotation efficiency in the gas spray from the turbulence pipe 16.

Figure 5:
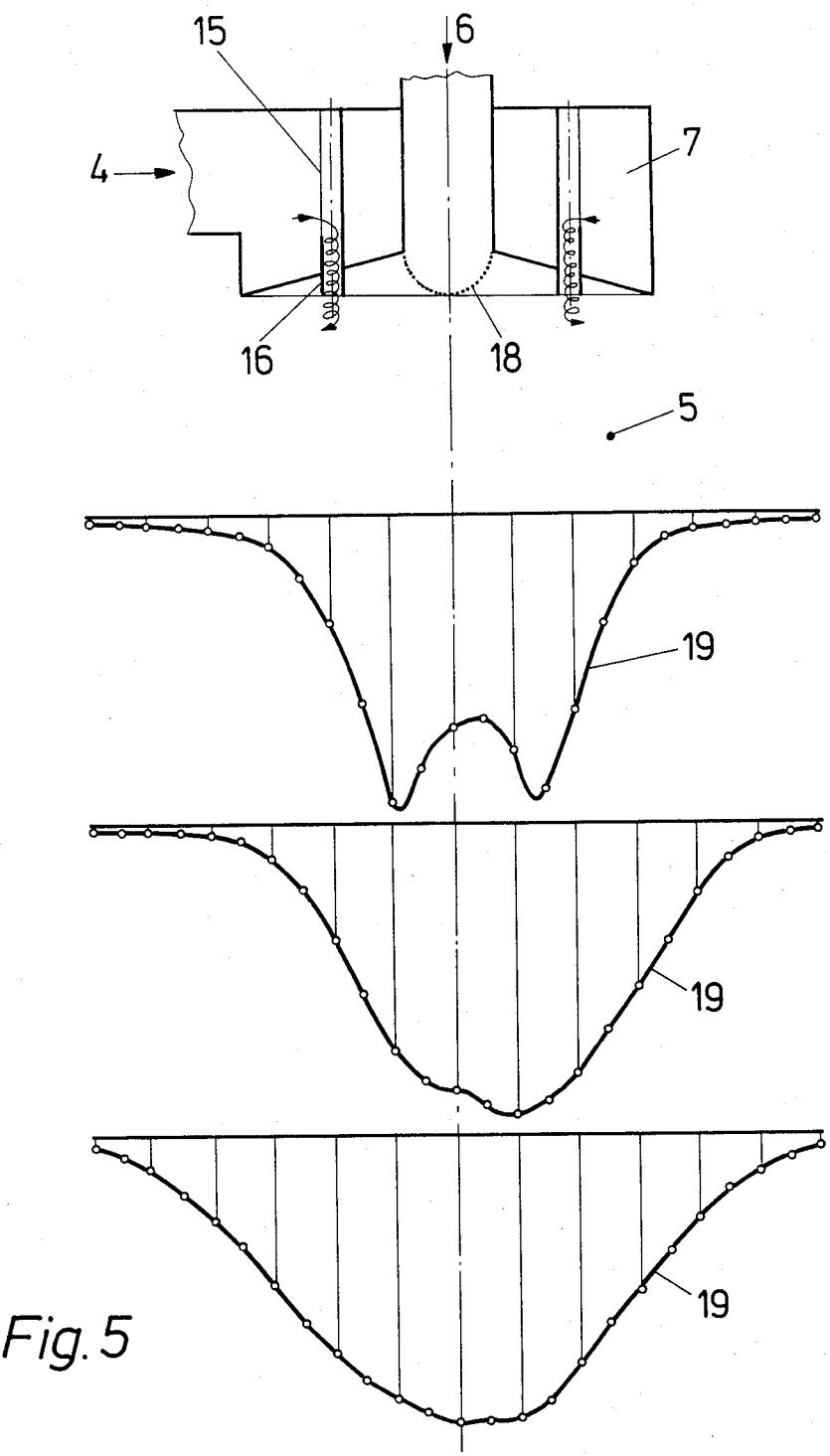

In FIG. 5, the primary gas 6 is directed from the center of the burner to discharge into the furnace chamber 5 via a porous hemisphere 18, defined in greater detail in Example 2. The secondary gas 4 is directed horizontally into the distribution chamber 7, from where it is distributed into six vertical turbulence pipes 16. The control clearance 15 of a turbulence pipe is situated on that side of the pipe which gives the gas jets discharging into the furnace chamber 5 from the turbulence pipe 16 a parallel, counter-clockwise rotational motion. The velocity distributions 19 of the total gas jet formed (primary and secondary gases) are given for three different distances from the burner, standardized in relation to the maximum velocity. The dimensions of FIG. 5 are drawn in proportion to the effective average discharge opening $d_{eff}$.

Figure 6:
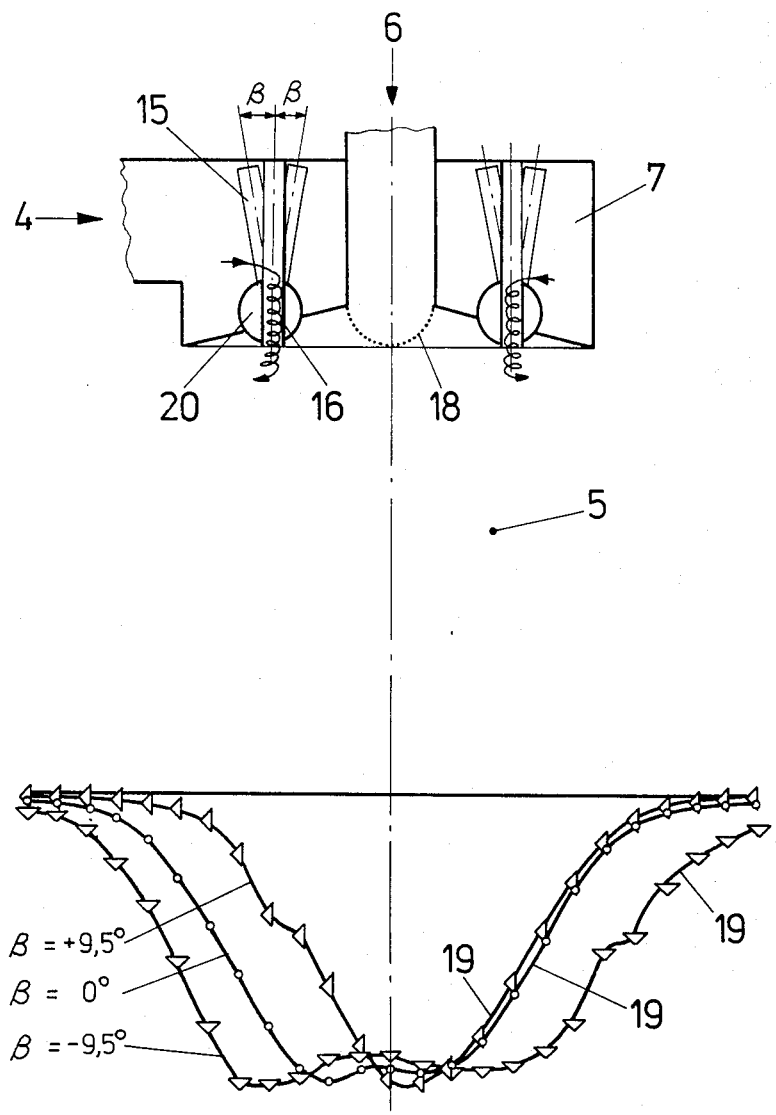

In FIG. 6, the primary gas 6 is directed from the center of the burner via a porous hemisphere 18 to discharge into the furnace chamber 5 in accordance with FIG. 5 in Example 2. The secondary gas 4 is directed horizontally into the distribution chamber 7, from which it is distributed into six turbulence pipes 16, the inclinations of which in the radial direction have been adjusted. The adjustment of the inclination is carried out by means of a ball joint 20. The inlets 15 of the turbulence pipes are installed in such a way that a counter-clockwise rotating spray is formed in every other turbulence pipe and a clockwise rotating spray in the rest. The velocity distributions 19 were measured at a height corresponding to the middle distance in FIG. 5. A more detailed analysis of FIG. 6 is presented in Example 3.

FIGS. 7-10 show, as results of measurements of Example 4 the constant-velocity curves 21 of the gas. The direction of the rotation of the gas jet discharging from the turbulence pipes is indicated by an arrow 22.

Figure 11:
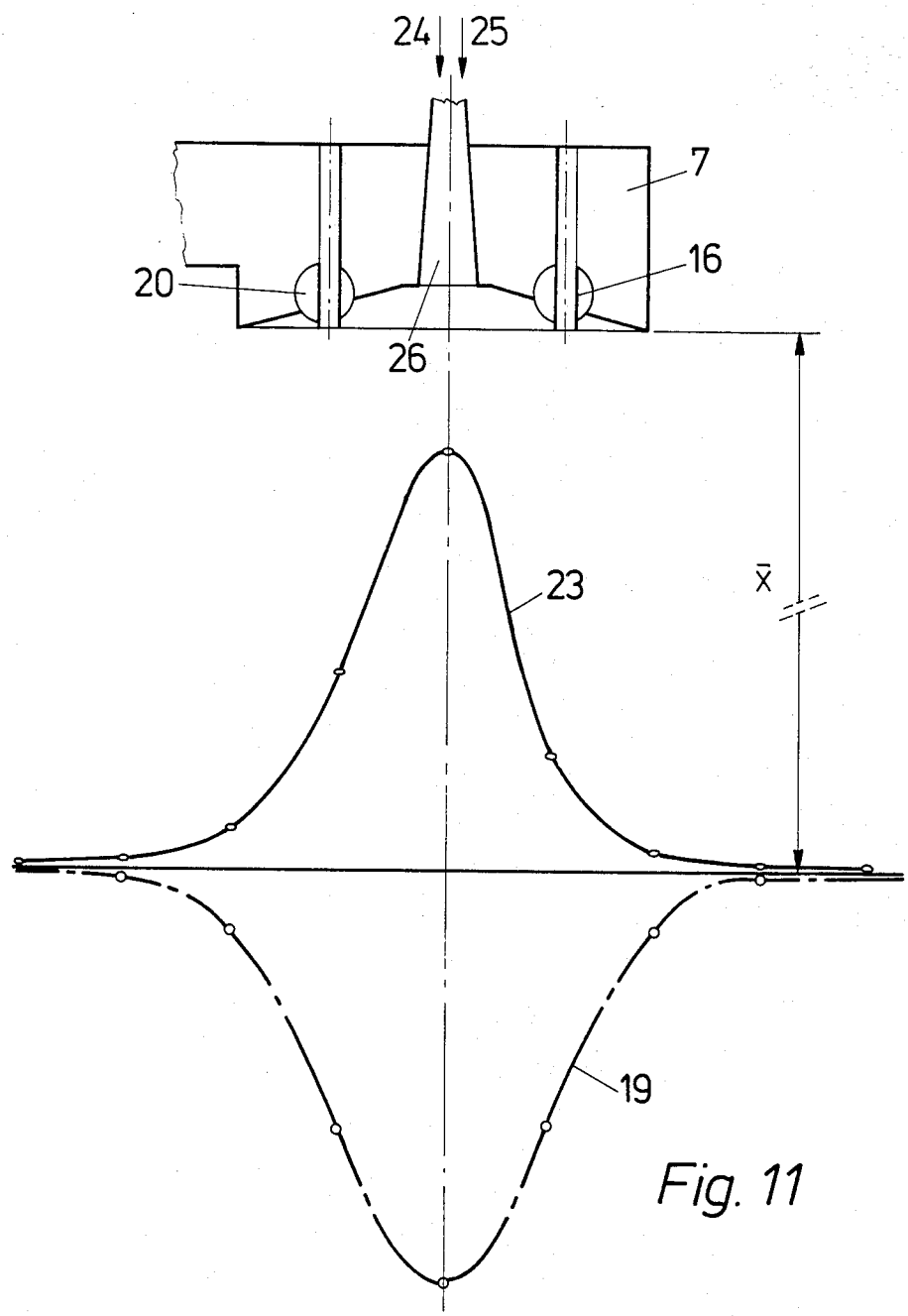

In FIG. 11, the distribution pattern 23 for pulverous solid material and the gas distribution pattern 19 have been formed from a suspension spray of a solid material 24 and carrier air 25, fed pneumatically via a slightly flared discharge opening 26 to a distance of 2.4 m from the discharge opening 26.

Figure 12:
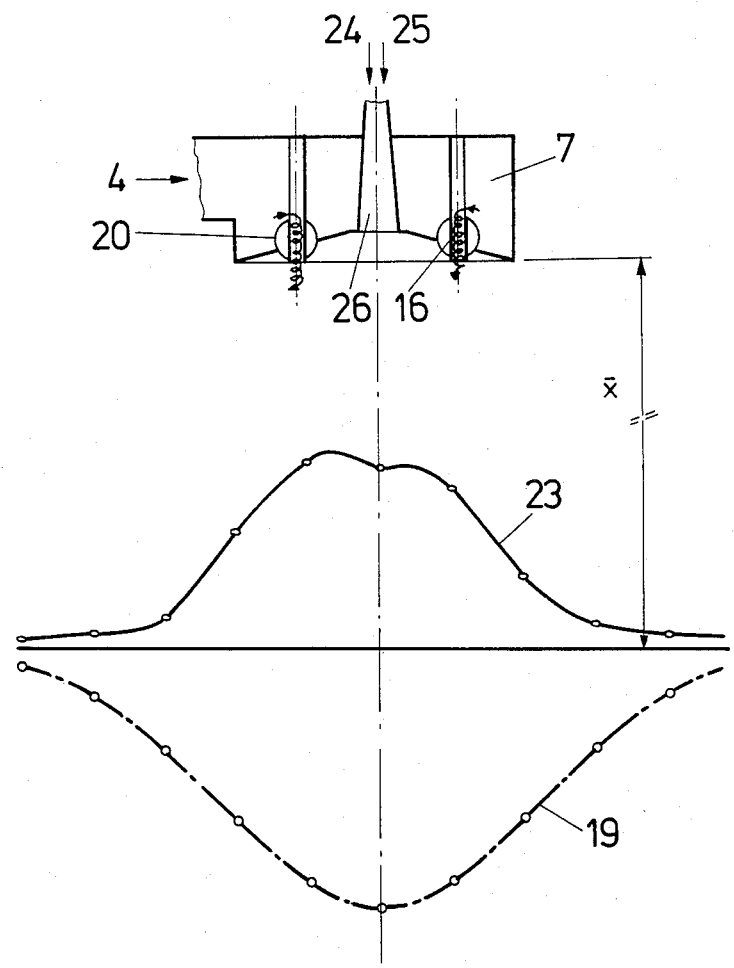

In FIG. 12, the distribution pattern 23 for the pulverous solid and the gas distribution pattern 19 have been formed in the manner depicted in FIG. 11 in such a way that also the secondary air 4, when discharging from the turbulence pipes 16, has participated in the dispersing and spreading of the pulverous solid.

The invention is described further in greater detail with the aid of examples.

EXAMPLE 1

The following embodiment example discusses the mixing and suction efficiency of the gas jets discharging from turbulence pipes 16 in flash smelting of copper, in which the total feed of solid material (concentrate + additives) is $\dot{m}_o = 54$ t/h and the total gas amount $Q_n = 28000$ m$^3$/h (oxygen-enriched air, $O_2$ enrichment = 40%). The gas temperature upon entering is 500 K and in the furnace 1600 K. 25% of the gas is used for the pre-dispersing of the concentrate mixture, and the remaining 75% is fed fron: around it via N turbulence pipes. Table 1 shows the constant C describing in the above-mentioned case the mixing and suction efficiency, i.e. $Q/Q_o = C\bar{x}$ (quantities defined in the text), as a function of the number (N) of the turbulence pipes and the rotation rate (S) of the turbulence, when the discharge surface area for the gas is constant (cf. the text).

TABLE 1

| N | d mm | C s = 0 | s = 0.1 | s = 0.3 | s = 0.6 | s = 1 |
|---|---|---|---|---|---|---|
| 1 | 369 | 1.55 | 1.94 | 2.71 | 3.88 | 5.43 |
| 3 | 213 | 2.69 | 3.36 | 4.70 | 6.72 | 9.41 |
| 6 | 151 | 3.79 | 4.74 | 6.63 | 9.48 | 13.27 |
| 12 | 106 | 5.40 | 6.75 | 9.45 | 13.50 | 18.90 |

On the basis of Table 1 it can be noted that an increase in the number of turbulence pipes and the rotation rate of the turbulence enhances the mixing (absorption capacity).

EXAMPLE 2

The suspending member for pulverous material is replaced in this and the two subsequent examples (3 and 4) by a porous hemisphere 18, the porosity of which, as defined by means of the ratio of pores to surface area, is 5.5% and the amount of air directed via it is 21.5% of the total air amount. An even air spray with a flare angle of approx. 20° was obtained from the center of the turbulence pipes 16 by means of the porous sphere.

The experiment arrangement was in accordance with FIG. 5. The rotational direction was the same in the six vertical turbulence pipes 16 situated symmetrically in relation to the central axis of the concentrate burner. The average rotation rate of the turbulence $S_{eff}$ of the spray was 0.3. The figure has been drawn in proportion to the effective diameter ($d_{eff}$), calculated according to the impulses of the gas flow. The velocity distributions 19 measured at three distances ($\bar{x}/d_{eff}$) by means of a hot wire anemometer have been standardized in proportion to the maximum velocity ($u/u_m$). The velocity distribution in this, as in the two subsequent examples, illustrates the axial velocity.

As seen in FIG. 5, the deflection of the gas flow and its orientation have been successful. The topmost velocity distribution curve 19 shows that the turbulence jets are being 'drilled' into and being mixed with the gas spray discharging from the center of the porous hemisphere. In the middle distribution curve 19 the gas spray has already been formed almost completely in the shape of a normal distribution. In the bottom distribution curve the effect of the turbulence pipes on the distribution is no longer visible.

EXAMPLE 3

A velocity distribution measurement ($u/u_m$) was carried out, with the arrangements and conditions as in Example 2, at one distance (FIG. 6), which corresponds to the middle measuring distance of Example 2. In the experiment the rotational direction of the gas in the turbulence pipes was changed so that in every other pipe the rotation was in the opposite direction.

The measurements were carried out with three deflection angles of the turbulence pipe: $\beta = +9.5°$, i.e. the turbulent jets meet on the central axis of the concentrate burner, $\beta = 0°$, i.e. the turbulent jets are parallel to the central axis, and $\beta = -9.5°$, i.e. the jets disperse from the central axis.

On the basis of the measurements it can be noted that either a flaring ($\beta < 0$) or convergence ($\beta > 0$) can be obtained with even this small an adjustment of the angle ($\beta$). The same can be expressed using a conventional spray flare angle $2\alpha$, in which $2\alpha = 2$ arc tan $[r(u=0.5\ u_m/x]$, in which case when $\beta = +9.5°$, $2\alpha = 11.0°$
when $\beta = 0°$, $2\alpha = 18.9°$
when $\beta = -9.5°$, $2\alpha = 31.9°$ The adjustment of the angle $\beta$ was made possible by the ball joint system 20 shown in FIG. 6 in each turbulence pipe 16. Under process conditions the ball joints 20 and the turbulence pipes 16 are cooled by conventional methods. The process requirements determine the final angle of inclination ($\beta$) of the turbulence pipe 16. Too small an angle of inclination ($\beta < 0$) and too great a distance of the turbulence pipes from the central axis of the burner inhibits the mixing of the gases (separate sprays).

EXAMPLE 4

The constant-velocity curves 21 were determined at the distance presented in Example 3, using the arrangements and conditions of Example 2, in order to illustrate the possibilities for regulating the shape of the distribution pattern by changing the directions of rotation and inclination of the turbulence pipes 16.

FIG. 7: The rotational direction 22 of the gas in all turbulence pipes 16 is the same, i.e. counter-clockwise: $\beta = -9.5°$. On the inner constant-velocity circle 21, the velocity ratio $u/u_{eff} = 6.4\%$, and on the following it is 1.7%. Bulges caused by the six turbulence pipes 16 can, furthermore, be observed in the inner circle.

FIG. 8: The rotational direction 22 of the gas is clockwise in pipes a, c and e and counter-clockwise in pipes b, d and f. The angle of inclination $\beta$ is $-9.5°$, $u/u_{eff}$ is 6.4% on the inner circle 21 and 1.7% on the following circle 21. As can be deduced from the flow fields produced by the turbulence pipes 16, the outward flow is strengthened between pipes b and c, d and e, and f and a, and in the rest of the clearances the inward flow is strengthened, whereby a triangular flow field is formed.

FIG. 9: The rotational direction 22 of the gas is clockwise in pipes a, b and c, and counter-clockwise in pipes d, e and f. The angle of inclination $\beta$ of the turbulence pipes 16 is $-9.5°$, $u/u_{eff}$ is 6.4% on the inner circle 21, 1.2% on the next, and 0.5 on the outermost one. As above, here it is also possible to determine on the basis of the rotational direction 22 of the gas sprays discharging from the turbulence pipes 16 that there is a bulge outwards between pipes a and f and a direction inwards between pipes c and d. This is shown in FIG. 9.

FIG. 10: The rotational direction 22 of the gas in the turbulence pipes 16 is the same as in FIG. 9. The turbulence pipes c and d have been tilted towards the pipes a and f, respectively, 9.5°, pipes b and e have, in addition, been oriented away from each other 4.75°, and pipes a and f even more, i.e. 9.5° $u/u_{eff}$ is 6.4% on the inner circle 21, 1.7% on the next one, and 0.5% on the outermost circle 21.

On the basis of these four series of measurements it can be noted that, by adjusting the angle of inclination of the turbulence pipes 16 and the rotational direction 22 of the gas in them, it is possible by means of this one and single apparatus to create a distribution pattern 21 of the desired shape. Especially the last case (FIG. 10) shows the formation of an asymmetrical (controlled) pattern, which is suitable for furnace structures with an oblong cross sectional area, for example, for feeding from the arch of a reverberatory furnace.

EXAMPLE 5

On a semi-industrial scale, the concentrate burner according to the invention was used in the manner depicted in FIGS. 11 and 12 in such a way that the pulverous solid material (concentrate +additives), 2250 kg/h, was fed in pneumatically from the center of the burner via a gently flaring cone 26, its discharge opening diameter being $\phi$ 100 mm and the carrier air being $Q_n=478$ $m^3/h$. The secondary air $Q_n=1747$ $m^3/h$ was directed via six vertically positioned turbulence pipes 16 giving a turbulence in the same direction. The diameter of the discharge opening of the turbulence pipe was $\phi$ 34 mm. The temperature of the primary and secondary gases was 300 K. The effective rotation rate of the turbulence was $S_{eff}=0.3$.

The sieve analysis for the pulverous solid was: 90% −80 μm, 75% −43 μm, 50% −39 μm, 25% −32 μm.

The distribution of solid material over the cross section of the suspension jet was measured at a distance of $\bar{x}=2.4$ m from the burner.

During the first stage, only the solid feed and the pneumatic air were on, and the secondary air was =0 (FIG. 11). During the second stage, the secondary air was also on (FIG. 12).

FIGS. 11 and 12 show the gas velocity distribution 19 as directed downwards, drawn in accordance with normal practice, and the distribution 23 of pulverous solid as directed upwards from the level of measurement.

A comparison of the solid material distributions 23 in FIGS. 11 and 12 shows that a pneumatic spray alone (FIG. 11) yields a relatively narrow distribution which, however, resembles the gas distribution 19. By the arrangement according to the invention, i.e. by adding the turbulence sprays (FIG. 12), the solid distribution 23 can be flared so as to be in accordance with the gas distribution 19. A comparison of the spray flare angles 2α determined in the manner of the example shows that the said angle 2α for the solid material distribution 23 in FIG. 12 is 3-fold compared with that in FIG. 11 (12.4°/4.0°). The respective angle 2α for the gas distribution is only 2.5-fold in FIG. 12 as compared with FIG. 11 (18.0°/7.3°).

Example 5 confirms the previous examples and shows that it is possible, by means of turbulence sprays, to enhance mixing and suction capacity in a suspension spray in such a way that they are able to transfer the pulverous solid material sidewards and thus produce a good spread and the necessary concentrate to gas ratio in the suspension spray.

What is claimed is:

1. A method for forming a directional and controlled suspension spray of a pulverous material and a reaction gas, comprising:
   (a) providing a reaction chamber having a dispersing member attached thereto;
   (b) providing a reaction gas;
   (c) providing a primary dispersion gas;
   (d) forming an admixture by mixing said pulverous material with said primary dispersion gas within said dispersing member;
   (e) continually feeding said admixture into said reaction chamber through a downward flow;
   (f) continually feeding said reaction gas into said reaction chamber in a plurality of at least partially turbulent jets formed symmetrically around said downward flow of said admixture thereby causing said turbulent jets of said reaction gas to discharge into said downward flow of said admixture gas, thereby producing a turbulent but controlled suspension spray comprised at least in part of said admixture having a selectively predetermined pattern.

2. The method of claim 1 wherein:
   (a) said turbulent jets have a direction of rotation that may be selectively altered; and
   (b) at least partially controlling said pattern of said suspension spray by selectively controlling said direction of rotation of at least some of said turbulent jets.

3. The method of claim 1 wherein:
   (a) each said turbulent jet has an angle of inclination with respect to said downward flow that may be selectively altered; and
   (b) at least partially controlling said pattern of said suspension spray by selectively altering said angle of inclination of at least some of said turbulent jets.

4. The method of claim 1 wherein:
   (a) each said turbulent jet has associated therewith a selectively controllable opening, such that tangential input velocity of said reaction gas at said opening can be selectively altered by selective control of said opening; and
   (b) at least partially controlling said pattern of said suspension spray by selectively controlling said opening thereby controlling said tangential input velocity.

* * * * *